United States Patent
Gurel et al.

(10) Patent No.: US 12,505,202 B2
(45) Date of Patent: Dec. 23, 2025

(54) METHODS AND MEANS FOR ATTESTATION OF A PLATFORM

(71) Applicant: Telefonaktiebolaget LM Ericsson (publ), Stockholm (SE)

(72) Inventors: Ilhan Gurel, Espoo (FI); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 18/548,396

(22) PCT Filed: Mar. 31, 2021

(86) PCT No.: PCT/EP2021/058510
§ 371 (c)(1),
(2) Date: Aug. 30, 2023

(87) PCT Pub. No.: WO2022/207104
PCT Pub. Date: Oct. 6, 2022

(65) Prior Publication Data
US 2024/0134966 A1 Apr. 25, 2024
US 2024/0232332 A9 Jul. 11, 2024

(51) Int. Cl.
*G06F 21/53* (2013.01)

(52) U.S. Cl.
CPC ........ *G06F 21/53* (2013.01); *G06F 2221/033* (2013.01)

(58) Field of Classification Search
CPC .... G06F 21/53; G06F 2221/033; G06F 21/57; H04L 63/10
See application file for complete search history.

(56) References Cited

U.S. PATENT DOCUMENTS 10,735,190 B1 * 8/2020 Khare .................. H04L 9/0877
2012/0246470 A1 9/2012 Nicolson et al.
(Continued)

FOREIGN PATENT DOCUMENTS

| EP | 3193485 A1 | 7/2017 | |
|---|---|---|---|
| WO | WO-2017131775 A1 * | 8/2017 | ............. G06F 21/57 |
| WO | 2019185125 A1 | 10/2019 | |

OTHER PUBLICATIONS

Wagner, P.G. et al.; "Establishing Secure Communication Channels Using Remote Attestation with TPM 2.0"; Security Trust and Management; 16th International Workshop; XP47561829A; Sep. 17-18, 2020; 17 pages.
(Continued)

*Primary Examiner* — Beemnet W Dada
(74) *Attorney, Agent, or Firm* — Sage Patent Group

(57) ABSTRACT

A method for enabling attestation of a platform comprising a Trusted Execution Environment, TEE, and a Trusted Platform Module, TPM is disclosed. The method is performed by the TEE and comprises: receiving, from an Application of the platform, a request for generation of an attestation quote, the request comprising a nonce, information on which PCR(s) to be used and information about Attestation Keys; establishing a connection to the TPM and obtaining from it at least one PCR value; generating an attestation quote based on the received nonce and the at least one PCR value; signing the attestation, and rendering the attestation quote available for the Application.

11 Claims, 5 Drawing Sheets

(56) References Cited

U.S. PATENT DOCUMENTS

| | | |
|---|---|---|
| 2014/0130124 A1 | 5/2014 | Ekberg |
| 2016/0050071 A1 | 2/2016 | Collart et al. |
| 2019/0140846 A1 | 5/2019 | Moore et al. |
| 2021/0117534 A1 | 4/2021 | Maximov et al. |

OTHER PUBLICATIONS

Communication pursuant to 94(3) EPC mailed Oct. 11, 2024 for European Patent Application No. 21716371.6, 9 pages.

* cited by examiner

METHODS AND MEANS FOR ATTESTATION OF A PLATFORM

TECHNICAL FIELD

The technology disclosed herein relates generally to the field of trusted computing, and in particular to methods and devices for facilitated attestation.

BACKGROUND

A platform, such as a Server, a Personal Computer (PC) or a laptop needs to be secured. To this end, a Trusted Platform Module (TPM) is conventionally used. The TPM is a computer chip (microcontroller) able to store artifacts in a secure manner, the artifacts being used to authenticate the platform, e.g. the PC. The Trusted Computing Group (TCG) specifies the TPM to be a crypto processor that exists in different flavors such as discrete TPM, firmware TPM, etc. The TPM as a hardware (HW) Root of Trust provides secure storage, crypto and key management functionalities, randomness source as well as Platform Control Registers (PCRs) used for storing measurements.

One measure to ensure the security of the platform is attestation, which is a process of measuring code and data in a defined environment and reporting these measurements as digitally signed data to a requesting entity. The requesting entity then evaluates these measurements further using known allowed values or whitelists.

A remote attestation protocol can be built between relevant parties by a combination of TPM capabilities, HW Root of Trust for measurement, HW Root of Trust for storage and HW Root of Trust for reporting on attester side as well as other entities such as e.g. attester, verifier and secure communication.

As a prerequisite, an Attestation Key (AK in the context of TPM 2.0), also known as Attestation Identity Key (AIK in the context of TPM 1.2), has to be generated within the TPM. The Attester needs to provide evidence that the AK is indeed a key that the TPM has generated. This is achieved with a process called "TPM key attestation". The process requires that the TPM has an Endorsement Key (EK) certificate issued by the TPM vendor, and the EK Certificate is used as evidence on that an authentic TPM is used in the process. That is, with the EK certificate the vendor vouches that the EK resides in an authentic TPM.

The TCG specifications also allows Direct Anonymous Attestation (DAA) as a cryptographic primitive. DAA enables remote authentication of a trusted computer whilst preserving privacy of the platform's user.

The existing solution, comprising the TPM based key attestation and platform attestation, has several drawbacks.

One drawback is that it requires that the TPM has an EK certificate with the EK private key. However, all TPMs do not come with an EK certificate. Instead instructions may be given to download it from the TPM vendor or the PC manufacturer. However, in practice it is sometimes difficult or even impossible to download them from the TPM vendor's location, e.g. due to failures in establishing connection to the downloading location, or for technical and operations service failures, such as network and/or service failures. When there is no EK certificate, it is simply impossible to establish trust to the TPM and achieve a binding of any AK keys to this particular TPM. In the absence of this trust chain, the TPM based platform attestation is no longer considered secure and trustworthy.

Another drawback of the known solution is that the TPM key attestation used for binding the AK to the TPM is very complex and also requires implementation of corresponding protocol. Further, in case of multiple applications it is difficult to ensure that the attestation is indeed coupled to a specific application.

Still another drawback is that DAA is based on a group signature scheme, and a DAA attestation is even more complex as it involves a number of steps such as joining to a group prior to the attestation.

TPM provides strong security with respect to keeping measurements in PCRs that can be populated during and after boot sequence, and the use of TPM is therefore favored.

SUMMARY

An objective of embodiments disclosed herein is to solve or at least alleviate at least one of the above-mentioned problems and to address and improve various aspects for TPM based key attestation and platform attestation. A particular objective is to enable an improved generation of attestation quotes even in the absence of a TPM EK certificate and TPM AK key. Another particular objective is to provide a solution having high flexibility in use of keys or algorithms that cannot be supported by TPMs by design. Still another objective is to provide means for securely distinguish between attestations coming from different applications/Trusted Execution Environments (TEEs). These objectives and others are achieved by the methods, devices, computer programs and computer program products according to the appended independent claims, and by the embodiments according to the dependent claims.

The objectives are according to a first aspect achieved by a for enabling attestation of a platform comprising a Trusted Execution Environment, TEE, and a Trusted Platform Module, TPM. The TPM in turn comprises a TPM Platform Configuration Register(s), PCR(s). The method is performed by the TEE. The method comprises receiving, from an Application of the platform, a request for generation of an attestation quote. The request comprises a nonce, information on which PCR(s) to be used and information relating to Attestation Keys. The method comprises establishing a connection, preferably a secure connection, to the TPM and obtaining from it at least one PCR value. The method further comprises generating an attestation quote based on the received nonce and the at least one PCR value and signing the attestation. The method further comprises rendering the attestation quote available for the Application.

The objectives are according to a second aspect achieved by a Trusted Execution Environment, TEE, for enabling attestation of a platform. The TEE (3) is configured to receive, from an Application of the platform, a request for generation of an attestation quote, the request comprising a nonce and information on which PCR(s) to be used. The TEE is further configured to establish a connection, preferably a secure connection, to the TPM (2) and obtain from it at least one PCR value. The TEE is configured to generate an attestation quote based on the received nonce and the at least one PCR value and to sign the attestation quote. The TEE is configured to render the attestation quote available for the Application.

The objectives are according to a third aspect achieved by a method for ensuring integrity of a platform. The method is performed in a Trusted Platform Module, TPM, of the platform. The method comprises establishing, to a Trusted Execution Environment, TEE, of the platform (6), a connection. The method further comprises providing, to the TEE, at least one PCR value.

The objectives are according to a fourth aspect achieved by a Trusted Platform Module, TPM, for ensuring integrity of a platform. The TPM is configured to co-operate with a Trusted Execution Environment, TEE, for performing an attestation of the platform In an embodiment, the TPM is configured to establish a connection, preferably a secure connection, to the TEE of the platform, and to provide at least one PCR value to the TEE.

The objectives are according to a fifth aspect achieved by a method for generating an attestation quote. The method is performed by an Application stored on a host of a platform. The method comprises providing to a Trusted Execution Environment, TEE, of the platform, a nonce and information on a Trusted Platform Module Platform Configuration Register, PCR, which is to be used. The method comprises obtaining, in response to the providing, the attestation quote from the TEE. The method further comprises providing the attestation quote to a Verifier for verification of authenticity of the attestation quote signature.

The objectives are according to a sixth aspect achieved by an Application enabling generation of an attestation quote.

The Application is configured to provide, to a Trusted Execution Environment, TEE, of a platform on which it is stored, a nonce and information on a Trusted Platform Module Platform Configuration Register, PCR, which is to be used; to obtain in response to the providing, the attestation quote from the TEE; and to provide the attestation quote to a Verifier for verification of authenticity of the attestation quote signature.

In an embodiment, the Application is associated with a single Trusted Execution Environment, TEE.

The objectives are according to a seventh aspect achieved by a platform comprising a Trusted Platform Module, TPM, and a Trusted Execution Environment, TEE, the platform further comprising processing circuitry, the processing circuitry being configured to cause the platform to perform a method according to the first aspect and a method according to the third aspect.

In different embodiments, the platform is a user equipment, a wireless communication device, a personal computer or a laptop or any device needing to perform an attestation procedure.

The objectives are according to an eight aspect achieved by a user equipment comprising a Trusted Platform Module, TPM, a Trusted Execution Environment, TEE and an Application. The platform further comprises processing circuitry, wherein the processing circuitry is configured to cause the user equipment to perform a method according to the first aspect and a method according to the third aspect.

Further objectives, features and advantages of the disclosed embodiments will be apparent upon reading the following description, claims and the accompanying drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

DETAILED DESCRIPTION

Figure 1:
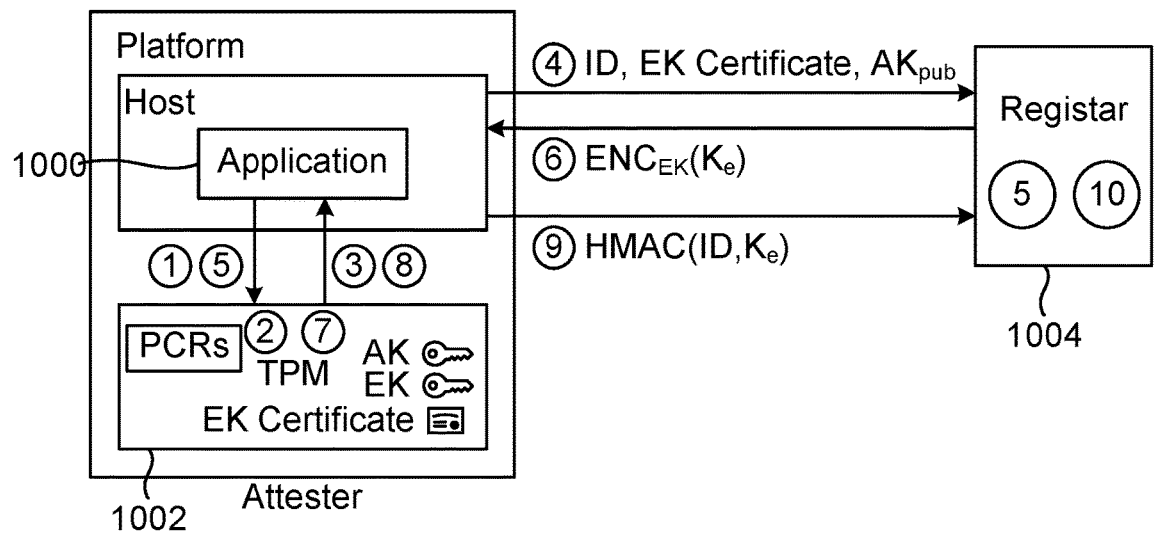
FIG. 1 illustrates a prior art TPM AK attestation.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates a prior art TPM AK attestation and is included for comparison, thereby providing thorough understanding of aspects of the present teachings. As noted in the background section an Attester needs to provide evidence that the AK is indeed a key that the TPM 1002 has generated, for which a process called "TPM key attestation" is used. The process requires that the TPM 1002 has an Endorsement Key (EK) certificate issued by a TPM vendor. The EK Certificate is used as evidence on that an authentic TPM 1002 is used in the process. Stated differently: with the EK certificate the vendor vouches that the EK resides in an authentic TPM 1002.

In a first step, indicated by an encircled 1, an Application woo requests the TPM 1002 to generate an AK.

In a second step, indicated by an encircled 2, the TPM 1002 generates the AK in response to the request.

In a third step, indicated by encircled 3, an AK public key and an EK certificate are returned to the Application woo. In this example, the EK certificate contains a Rivest-Shamir-Adleman (RSA) public key, but there are various other public-key cryptosystem as well.

In a fourth step, indicated by encircled 4, the Application 1000 provides its ID, EK certificate and AK public key to a Registrar 1004.

In a fifth step, indicated by encircled 5, the Registrar 1004 validates the received EK certificate for ensuring that it is issued by a known TPM vendor.

In a sixth step, indicated by encircled 6, the Registrar 1004 generates a unique Key K e and encrypts it by using the EK public key. The process is known as "make and activate credentials" in the TCG TPM 2.0 literature. It results in that encrypted data can only be decrypted by the TPM 1002 if the AK is loaded into the TPM 1002. Otherwise, the TPM 1002 will refuse to unseal the encrypted credential.

In a seventh step, indicated by encircled 7, the Application 1000 makes an "activate credential-request" to the TPM 1002.

In an eight step, indicated by encircled 8, the TPM 1002 unseals the encrypted credential only if the AK is located in the TPM 1002.

In a ninth step, indicated by encircled 9, the Application woo generates a Hash-based Message Authentication Code (HMAC) of its ID by using the unsealed credential and then sends the result back to the Registrar 1004.

In a tenth step, indicated by encircled 10, the Registrar 1004 verifies the received HMAC. If the verification succeeds, the Registrar 1004 knows that the AK was generated by an authentic TPM and the AK is bound to that particular TPM 1002.

After a successful TPM AK key attestation, the AK can be used for signing attestation quotes and a Verifier can validate signatures by using an AK public key registered to the Registrar 1004. As noted earlier, it may be that the TPM 1002 does not come with an EK certificate, and it may difficult to obtain it.

Figure 2:
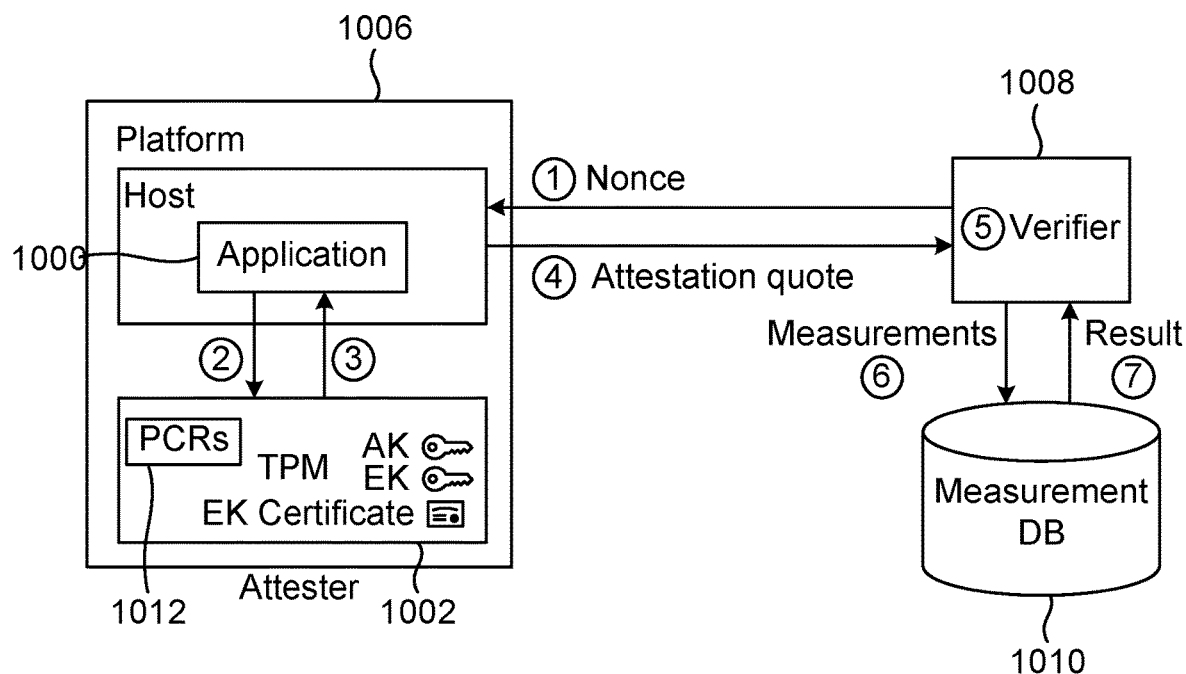
FIG. 2 illustrates a prior art TPM based platform attestation.

FIG. 2 illustrates a prior art TPM based platform attestation. As has been described, this attestation requires that the AK is associated with the TPM 1002 as a result of a TPM key attestation. Further, it requires that measurements are placed into the relevant Platform Configuration Registers (PCRs) 1012, e.g. during and/or after a boot. Further still, it requires that a Verifier 1008 keeps known whitelists and that it knows the AK public key that is associated with the platform 1006 being attested.

In a first step, indicated by an encircled 1, the Verifier 1008 sends a nonce for freshness and in order to preventing replay attacks.

In a second step, indicated by an encircled 2, the Application woo makes a request to the TPM 1002 to generate an "attestation quote". To this end the TPM 1002 provides the AK handle, nonce and information on which PCRs 1012 to use.

In a third step, indicated by an encircled 3, the TPM 1002 returns quote data to the Application woo.

In a fourth step, indicated by an encircled 4, the Application woo provides the attestation quote and the relevant data to the Verifier 1008.

In a fifth step, indicated by an encircled 5, the Verifier 1008 verifies that the attestation quote was signed by the TPM-generated AK.

In a sixth step, indicated by an encircled 6, the Verifier 1008 checks against the whitelists.

In a seventh step, indicated by an encircled 7, if the sixth step was successful, the Attestation quote result becomes available to the Verifier 1008.

Briefly, the disclosed various embodiments of methods and means, overcome the drawbacks of prior art attestation noted in the background section by introducing a concept of a TEE combined with a TPM and the use of TPM PCRs.

Figure 3:
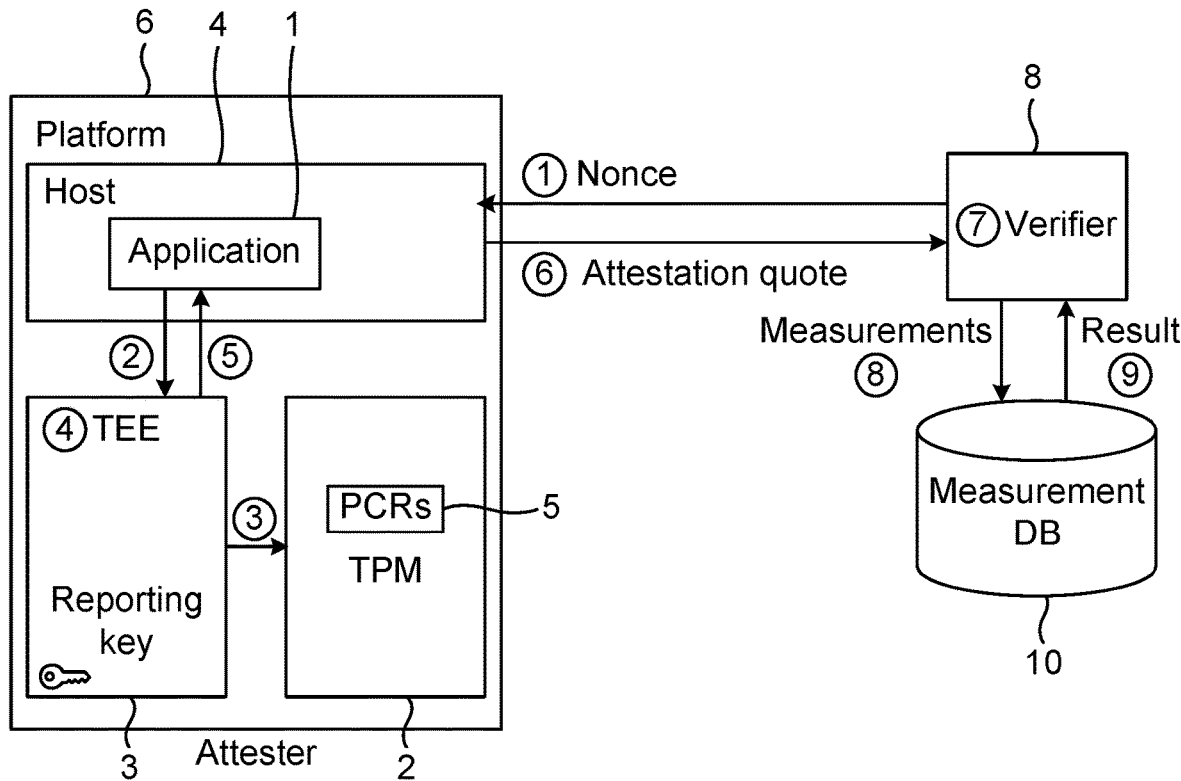
FIG. 3 illustrates embodiments according to the teachings herein.

FIG. 3 illustrates embodiments according to teachings herein. A platform 6, in which embodiments according to the teachings herein may be implemented, is a TPM based platform, e.g. a PC, a laptop or a user equipment. A TPM chip is provided with a unique asymmetric key known as Endorsement Key (EK), which is typically burned by the manufacturer thereof. The platform 6 comprises a TEE 3, which handles Reporting Key certificate provisioning seamlessly (this certificate is also known as PCK certificate in the context of Intel SGX DCAP). The TEE 3 collaborates with a TPM 2, which holds one or more TPM PCRs 5. TEE technologies, also known as the secure enclave technologies, provide hardware (HW) enforced strong isolation and the technical capabilities such as being able to execute sensitive code within an isolated environment as well as measuring and reporting code and data. The collaboration between the TEE 3 and the TPM 2 gives combined benefits of both the TEE technologies and TPMs. While the TPM 2 is used for storing measurements in the TPM PCRs 5, the secure enclaves and their platform identities are utilized for generating and signing attestation quotes that include measurement values from the TPM PCRs 5. That is, the herein provided solution enables supporting TPM based measured boot and complements it with TEE based platform identities and TEEs strong HW isolation capabilities for cryptographic operations.

The method ensures that the owner/user of the platform 6, can be assured of the integrity of its platform 6, i.e. that it behaves as intended. In the following a number of steps are described in a certain order. However, it is noted that in different embodiments, not all steps need to be included, and that the steps may be performed in another order. Depending e.g. on the particular platform at hand or the particular application, some steps may be omitted. The TPM 2 is important as it, for instance, makes sure that a boot process starts from a trusted combination of hardware and software.

With reference still to FIG. 3, an attestation procedure for attestation of the platform 6 is described next.

In a first step, indicated by an encircled 1, a Verifier 8, sends a nonce to a host 4 on which an Application 1 is stored. The nonce is sent for freshness and for thereby preventing replay attacks. The Verifier 8 may be a known independent Verifier 8, which is able to obtain cryptographic proof on the identity of the platform 6 and evidence of the integrity of software loaded on the platform 6 when it started up, etc. The Verifier 8 may, for instance, comprise a set of protocols and procedures for determining whether a particular platform 6 has been launched with untampered software.

In a second step, indicated by an encircled 2, the Application 1 makes a request to (code in) a Trusted Execution Environment (TEE) 3 in order to generate an "attestation quote". This request is made by providing a nonce and information on which TPM PCRs 5 to use.

In a third step, indicated by an encircled 3, the TEE 3 establishes a connection, preferably a secure connection, to the TPM 2 and retrieves PCR values.

In a fourth step, indicated by an encircled 4, the TEE 3 generates an attestation quote and signs it by using an attestation key. The TEE 3 then appends an associated certificate to the attestation quote. The signing comprises using an attestation key, e.g. a reporting key, and appending an associated certificate. In other embodiments, the attestation quote may be signed by using a group signing scheme. In such embodiments, the attestation quote comprises related group information.

In a fifth step, indicated by an encircled 5, the Application 1 fetches the attestation quote from the TEE 3.

In a sixth step, indicated by an encircled 6, the Application 1 provides the obtained attestation quote to the Verifier 8.

In a seventh step, indicated by an encircled 7, the Verifier 8 verifies the attestation quote signature as well as the TEE Reporting Key certificate chain making sure that the attestation quote indeed comes from an authentic silicon holding TEE 3 and TPM 2.

In an eight step, indicated by an encircled 8, the Verifier 8 checks the attestation quote entries against the corresponding values in its whitelist(s). The Verifier 8 may also do some additional checks with external parties, such as e.g. with a manager of TEE specific attestations services.

In a ninth step, indicated by an encircled 9, the attestation quote result becomes available and can be used for proving that the AK was indeed generated by the authentic TPM 2 and hence that the AK is bound to that particular TPM 2.

The methods and devices provide, in various embodiments, a number of advantages. For instance, generation of attestation quotes is enabled even in the absence of TPM EK certificate and TPM AK key. These are bottlenecks of the prior art TPM based Platform attestation, as described earlier. Another advantage is that the complex TPM key attestation phase is removed. Yet another advantage is that TPM PCR values can still be used, meaning that a system can measure and populate TPM PCRs as if nothing is changed. Further, an improved flexibility is provided, such as enabling the use of stronger keys or algorithms (for signing attestation quotes) that cannot be supported by TPMs by design. Still further, anonymous attestation is achieved by using Intel EPID (Enhanced Privacy ID) as the underling TEE, for instance e.g. Intel SGX. Yet further, by associating each application with its own TEE, which are programmatically coupled to an application, signed and thus controlled instances, an attestation framework is provided that can securely distinguish between attestation coming from different applications and/or TEEs.

Figure 4:
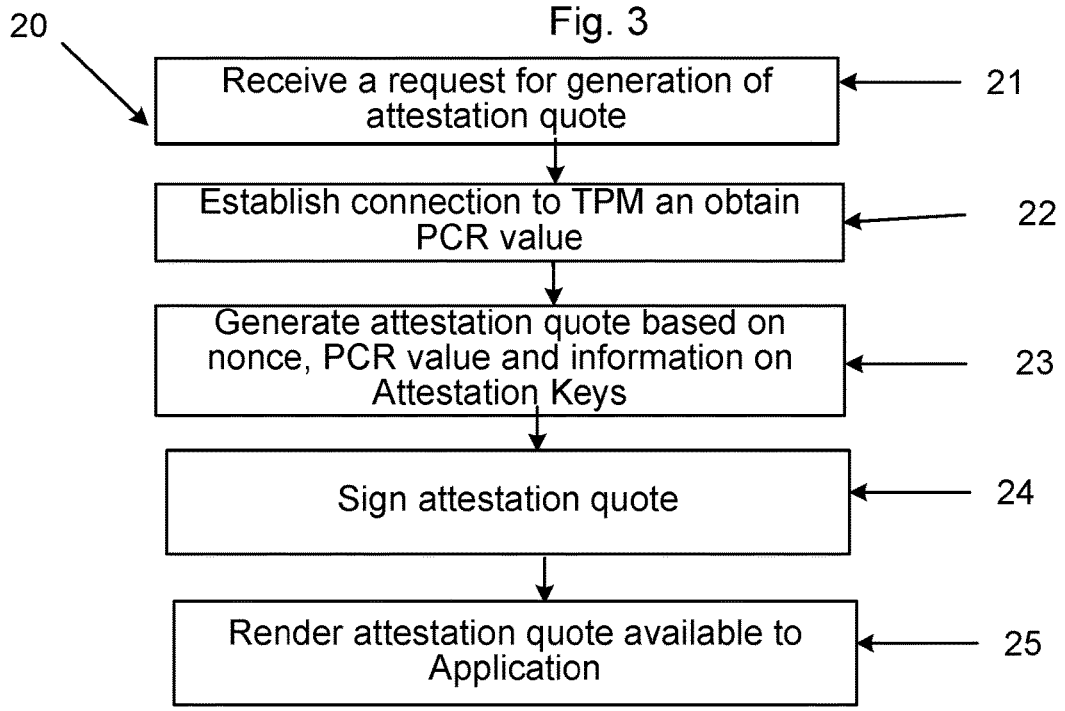
FIG. 4 is a flowchart of embodiments of a method performed by a TEE.

FIG. 4 illustrates a flowchart illustrating embodiments of a method 20 in a TEE 3 for enabling attestation of a platform 6, which may be a user equipment such as a wireless communication device, a laptop, a computer etc. The platform 6 further comprises a Trusted Execution Environment, TEE, 3 and a Trusted Platform Module, TPM 2. The TPM 2 in turn comprises a TPM Platform Configuration Register(s), PCR(s) 5. The embodiments of the method 20 are performed by the TEE 3, comprised in the platform 6.

The method 20 comprises receiving 21, from an Application 1 of the platform 6, a request for generation of an attestation quote. The request comprises a nonce, information on which PCR(s) 5 to be used and information about Attestation Keys. The information on the Attestation Keys may be information on which Attestation Keys to use, on how the Attestation Keys are to be used or information to be used for establishing the Attestation Keys.

The method 20 comprises establishing 22 a connection, preferably a secure connection, to the TPM 2 and obtaining from it at least one PCR value.

The method 20 comprises generating 23 an attestation quote based on the received nonce and the at least one PCR value.

The method 20 comprises signing 24 the attestation.

The method 20 comprises rendering 25 the attestation quote available for the Application 1.

In an embodiment, the method 20 comprises, before the rendering 25, providing the attestation quote to the Application 1 for verification of the attestation. The Application 1 makes such verification by providing the attestation quote to the Verifier 8, which verifies the attestation quote signature as well as the TEE Reporting Key certificate chain to make sure that attestation comes from an authentic silicon holding TEE and TPM. The verification has been described earlier in connection with FIG. 3, in particular described in the sixth, seventh and eight steps.

Figure 5:
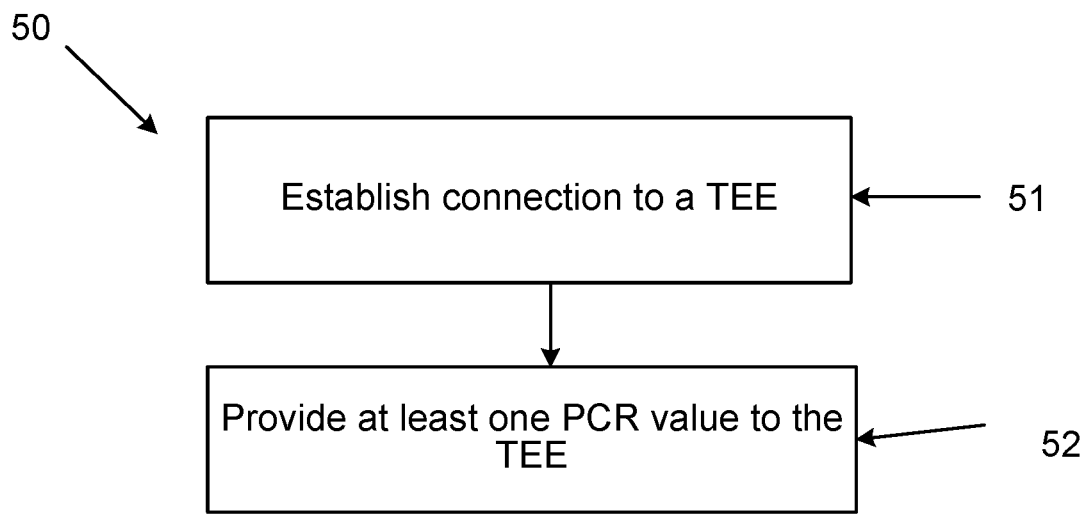
FIG. 5 is a flowchart of embodiments of a method performed by a TPM.

FIG. 5 illustrates a flowchart illustrating embodiments of a method 50 for ensuring integrity of a platform 6, such as a laptop or a wireless communication device. The embodiments of the method 50 are performed by a Trusted Platform Module, TPM, 2 of the platform 6.

The method 50 comprises establishing 51 a connection, preferably a secure connection, to a Trusted Execution Environment, TEE, 3 of the platform 6.

The method 50 comprises providing 52 at least one PCR value to the TEE 3.

In an embodiment, the providing 52 is made without use of an Endorsement Key Certificate. As noted earlier, the TPM still use TPM PCR values, whereby the methods can be implemented transparently. Further, complications related to the EK certificates, e.g. need for downloading them, are removed.

Figure 6:
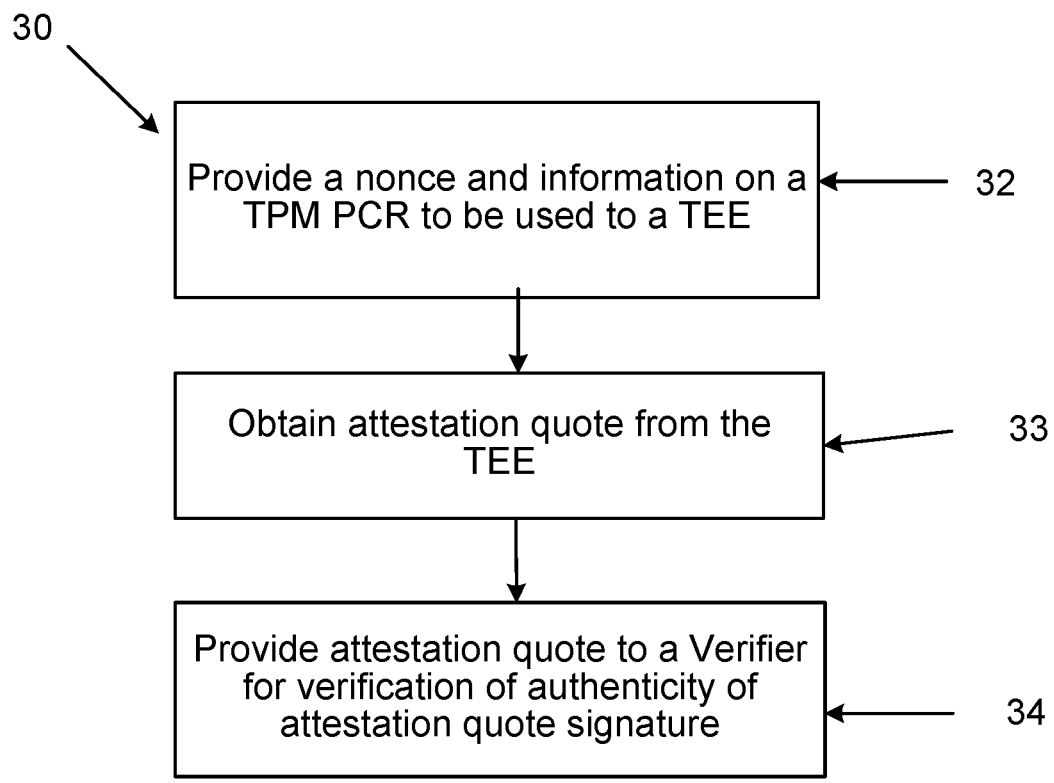
FIG. 6 is a flowchart of embodiments of a method performed by an Application.

FIG. 6 illustrates a flowchart illustrating embodiments of a method 30 for generating an attestation quote. The embodiments of the method 30 are performed by an Application 1 that is stored on a host 4 of a platform 6.

The method 30 comprises providing 32, to a Trusted Execution Environment, TEE 3 of the platform 6, a nonce and information on a Trusted Platform Module Platform Configuration Register, PCR 5, which is to be used. The Application 1 makes a request to the (code in the) TEE 3 to generate an attestation quote by providing the nonce and the information on the TPM PCR 5.

The method 30 comprises obtaining 33 in response to the providing 32, the attestation quote from the TEE 3.

The method 30 comprises providing 34 the attestation quote to a Verifier 8 for verification of authenticity of the attestation quote signature. The Verifier 8 makes the attestation quote result available.

In an embodiment, the Application 1 is associated with a single Trusted Execution Environment, TEE, 3. As noted earlier, by associating each application with its own TEE an attestation framework is achieved that can secure distinguish between attestation coming from different applications/TEEs. The TEE 3 is programmatically coupled to an application 1, signed and are thus controlled instances.

Figure 7:
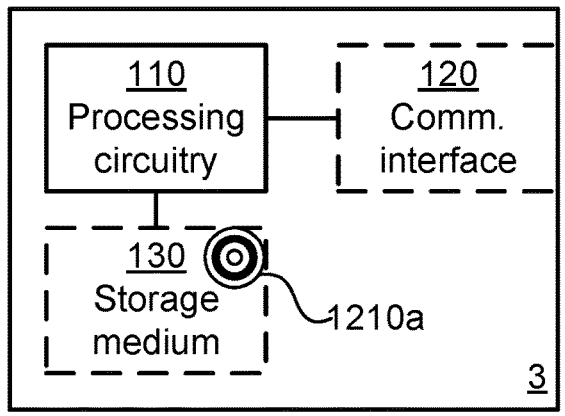
FIG. 7 is a schematic diagram showing functional units of a TEE according to an embodiment.
Figure 13:
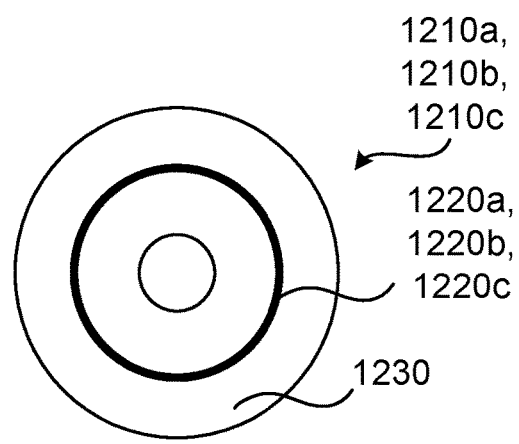
FIG. 13 shows one example of a computer program product comprising computer readable storage medium according to an embodiment.

FIG. 7 is a schematic diagram showing functional units of a TEE according to an embodiment. FIG. 7 schematically illustrates, in terms of a number of functional units, the components of a TEE 3 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 1210a (as shown in FIG. 13), e.g. in the form of a storage medium 130. The processing circuitry 110 may further be provided as at least one application specific integrated circuit (ASIC), or field programmable gate array (FPGA).

Particularly, the processing circuitry 110 is configured to cause the TEE 3 to perform a set of operations, or steps, as disclosed herein. For example, the storage medium 130 may store the set of operations, and the processing circuitry 110 may be configured to retrieve the set of operations from the storage medium 130 to cause the TEE 3 to perform the set of operations. The set of operations may be provided as a set of executable instructions.

The processing circuitry 110 is thereby arranged to execute methods as disclosed herein. The storage medium 130 may also comprise persistent storage, which, for example, can be any single one or combination of magnetic memory, optical memory, solid state memory or even remotely mounted memory. The TEE 3 may further comprise a communications interface 120 at least configured for communications with other entities, functions, nodes, and devices. As such the communications interface 120 may comprise one or more transmitters and receivers, comprising analogue and digital components. The processing circuitry 110 controls the general operation of the TEE 3 e.g. by sending data and control signals to the communications interface 120 and the storage medium 130, by receiving data and reports from the communications interface 120, and by retrieving data and instructions from the storage medium 130. Other components, as well as the related functionality, of the TEE 3 are omitted in order not to obscure the concepts presented herein.

Figure 8:
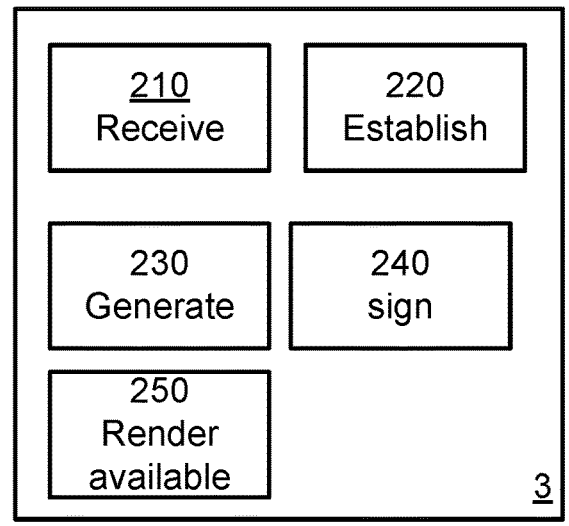
FIG. 8 is a schematic diagram showing functional units of a TEE according to an embodiment.

FIG. 8 is a schematic diagram showing functional modules of a TEE according to an embodiment. FIG. 8 schematically illustrates, in terms of a number of functional modules, the components of a TEE according to an embodiment. The TEE 3 of FIG. 8 comprises a number of functional modules: a Receive module 210 configured to perform step 21, an establish module 220 configured to perform step 22, an generate module 230 configured to perform step 23, a sign module 240 configured to perform step 24 and a render module 250 configured to perform step 25. The TEE 3 of FIG. 8 may further comprise a number of optional functional modules. For instance, a functional module may be provided that is configured to, before the rendering, provide the attestation quote to the Application 1 for verification of the attestation. In general terms, each functional module 210, 220, 230, 240, 250 may in one embodiment be implemented only in hardware and in another embodiment with the help of software, i.e., the latter embodiment having computer program instructions stored on the storage medium 130 which when run on the processing circuitry makes the TEE 3 perform the corresponding steps mentioned e.g. in conjunction with FIG. 4. It should also be mentioned that even though the modules correspond to parts of a computer program, they do not need to be separate modules therein, but the way in which they are implemented in software is dependent on the programming language used. Preferably, one or more or all functional modules 210, 220, 230, 240, 250 may be implemented by the processing circuitry 110, possibly in cooperation with the communications interface 120 and/or the storage medium 130. The processing circuitry 110 may thus be configured to from the storage medium 130 fetch instructions as provided by a functional module 210, 220, 230, 240, 250 and to execute these instructions, thereby performing any steps as disclosed herein.

The TEE 3 may be provided as a standalone device or as a part of at least one further device. For example, the TEE 3 may be provided in the platform 6.

Figure 9:
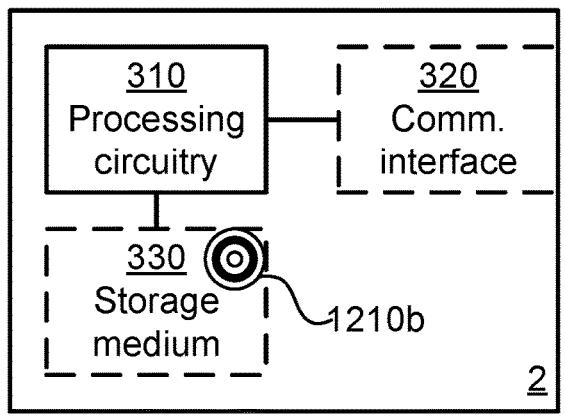
FIG. 9 is a schematic diagram showing functional modules of a TPM unit according to an embodiment.

FIG. 9 is a schematic diagram showing functional units of a TPM 2 according to an embodiment. FIG. 9 schematically illustrates, in terms of a number of functional units, the components of a TPM 2 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as shown in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the TPM 2 to perform a set of operations, or steps, as disclosed herein. For example, the storage medium 330 may store the set of operations, and the processing circuitry 310 may be configured to retrieve the set of operations from the storage medium 330 to cause the TPM 2 to perform the set of operations. The set of operations may be provided as a set of executable instructions.

The processing circuitry 310 is thereby arranged to execute methods as disclosed herein. The storage medium 330 may also comprise persistent storage, which, for example, can be any single one or combination of magnetic memory, optical memory, solid state memory or even remotely mounted memory. The TPM 2 may further comprise a communications interface 320 at least configured for communications with other entities, functions, nodes, and devices. As such the communications interface 320 may comprise one or more transmitters and receivers, comprising analogue and digital components. The processing circuitry 310 controls the general operation of the TPM 2 e.g. by sending data and control signals to the communications interface 320 and the storage medium 330, by receiving data and reports from the communications interface 320, and by retrieving data and instructions from the storage medium 330. Other components, as well as the related functionality, of the TPM 2 are omitted in order not to obscure the concepts presented herein.

Figure 10:
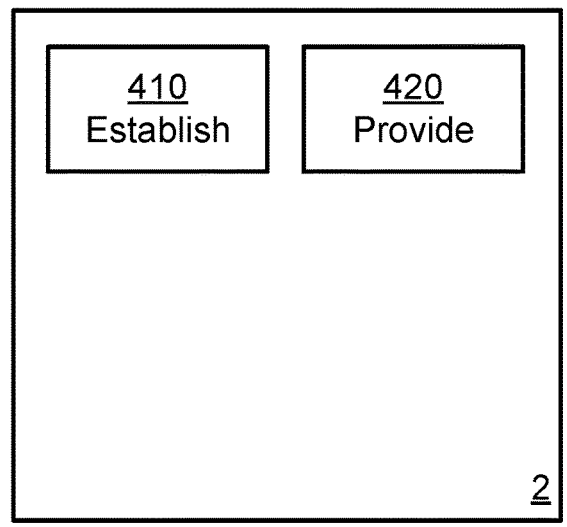
FIG. 10 is a schematic diagram showing functional modules of a TPM unit according to an embodiment.

FIG. 10 is a schematic diagram showing functional modules of a TPM 2 according to an embodiment. FIG. 10 schematically illustrates, in terms of a number of functional modules, the components of a TPM 2 according to an embodiment. The TPM 2 of FIG. 10 comprises a number of functional modules: an Establish module 410 configured to perform step 51, and an provide module 420 configured to perform step 52. The TPM 2 of FIG. 10 may further comprise a number of optional functional modules. In general terms, each functional module 410, 420 may in one embodiment be implemented only in hardware and in another embodiment with the help of software, i.e., the latter embodiment having computer program instructions stored on the storage medium 330 which when run on the processing circuitry makes the TPM 2 perform the corresponding steps mentioned e.g. in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 410, 420 may be implemented by the processing circuitry 310, possibly in cooperation with the communications interface 320 and/or the storage medium 330. The processing circuitry 310 may thus be configured to from the storage medium 330 fetch instructions as provided by a functional module 410, 420 and to execute these instructions, thereby performing any steps as disclosed herein.

The TPM may be provided as a standalone device or as a part of at least one further device. For example, the TPM may be provided in the platform 6.

Figure 11:
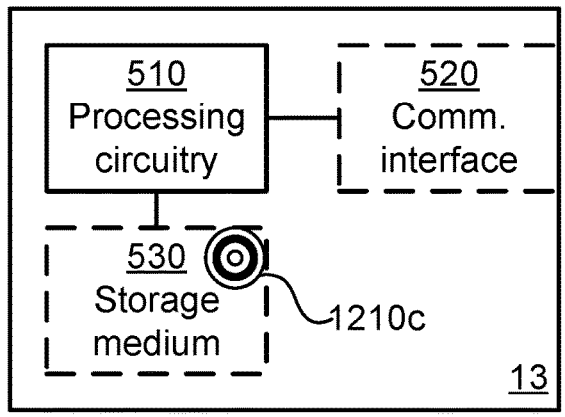
FIG. 11 is a schematic diagram showing functional modules of an Application according to an embodiment.

FIG. 11 is a schematic diagram showing functional units of an Application 1 according to an embodiment. FIG. 11 schematically illustrates, in terms of a number of functional units, the components of an Application 1 according to an embodiment. Processing circuitry 510 is provided using any combination of one or more of a suitable central processing unit (CPU), multiprocessor, microcontroller, digital signal processor (DSP), etc., capable of executing software instructions stored in a computer program product 1210b (as shown in FIG. 13), e.g. in the form of a storage medium 530. The processing circuitry 510 may further be provided as at least one application specific integrated circuit (ASIC), or field programmable gate array (FPGA).

Particularly, the processing circuitry 510 is configured to cause the Application 1 to perform a set of operations, or steps, as disclosed herein. For example, the storage medium 530 may store the set of operations, and the processing circuitry 510 may be configured to retrieve the set of operations from the storage medium 530 to cause the Application 1 to perform the set of operations. The set of operations may be provided as a set of executable instructions.

The processing circuitry 510 is thereby arranged to execute methods as disclosed herein. The storage medium 530 may also comprise persistent storage, which, for example, can be any single one or combination of magnetic memory, optical memory, solid state memory or even remotely mounted memory. The Application 1 may further comprise a communications interface 520 at least configured for communications with other entities, functions, nodes, and devices. As such the communications interface 520 may comprise one or more transmitters and receivers, comprising analogue and digital components. The processing circuitry 510 controls the general operation of the Application 1 e.g. by sending data and control signals to the communications interface 520 and the storage medium 530, by receiving data and reports from the communications interface 520, and by retrieving data and instructions from the storage medium 530. Other components, as well as the related functionality, of the Application 1 are omitted in order not to obscure the concepts presented herein.

Figure 12:
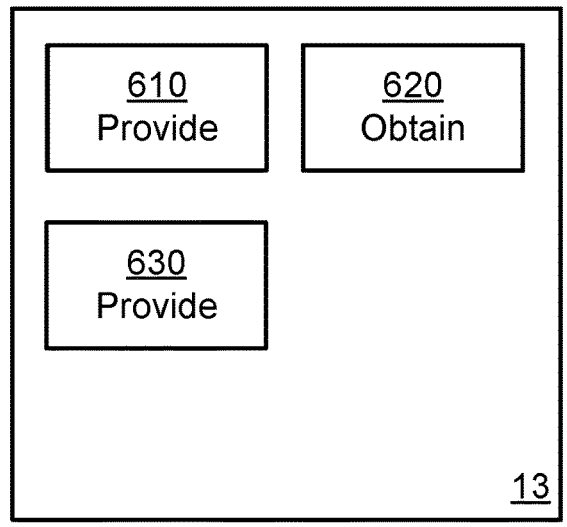
FIG. 12 is a schematic diagram showing functional modules of an Application according to an embodiment.

FIG. 12 is a schematic diagram showing functional modules of an Application 1 according to an embodiment. FIG. 12 schematically illustrates, in terms of a number of functional modules, the components of an Application 1 according to an embodiment. The Application 1 of FIG. 12 comprises a number of functional modules: a Provide module 610 configured to perform step 32, an obtain module 620 configured to perform step 33 and another Provide module 630, configured to perform step 33. The Application 1 of FIG. 12 may further comprise a number of optional functional modules. The Application 1 may be associated with a single Trusted Execution Environment, TEE, 3. In general terms, each functional module 610, 620, 630 may in one embodiment be implemented only in hardware and in another embodiment with the help of software, i.e., the latter embodiment having computer program instructions stored on the storage medium 530 which when run on the processing circuitry makes the Application 1 perform the corresponding steps mentioned e.g. in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 610, 620, 630 may be implemented by the processing circuitry 510, possibly in cooperation with the communications interface 520 and/or the storage medium 530. The processing circuitry 510 may thus be configured to from the storage medium 530 fetch instructions as provided by a functional module 610, 620, 630 and to execute these instructions, thereby performing any steps as disclosed herein.

The Application 1 may be provided as a standalone device or as a part of at least one further device. For example, the Application 1 may be provided in the platform 6.

The platform 6 may, in some embodiments comprise the TPM 2 and the Trusted Execution Environment, TEE 3. The platform 6, may be user equipment and further comprise processing circuitry 510, wherein the processing circuitry is configured to cause the platform 6 to perform the various embodiments of the described method performed by the TEE 3 and the various embodiments of the described method performed by the TPM 2. In other embodiments, the platform 6 further comprises also the Application 1.

FIG. 13 shows one example of a computer program product 1210a, 1210b, 1210C comprising computer readable means 1230. On this computer readable means 1230, a computer program 1220a can be stored, which computer program 1220a can cause the processing circuitry 110 and thereto operatively coupled entities and devices, such as the communications interface 120 and the storage medium 130, to execute methods according to embodiments described herein. The computer program 1220a and/or computer program product 1210a may thus provide means for performing any steps of the TEE 3 as herein disclosed.

On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the TPM 2 as herein disclosed.

On this computer readable means 1230, a computer program 1220C can be stored, which computer program 1220C can cause the processing circuitry 510 and thereto operatively coupled entities and devices, such as the communications interface 520 and the storage medium 530, to execute methods according to embodiments described herein. The computer program 1220C and/or computer program product 1210C may thus provide means for performing any steps of the Application 1 as herein disclosed.

In the example of FIG. 13, the computer program product 1210a, 1210b, 1210C is illustrated as an optical disc, such as a CD (compact disc) or a DVD (digital versatile disc) or a Blu-Ray disc. The computer program product 1210a, 1210b, 1210C could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b, 1220C is here schematically shown as a track on the depicted optical disk, the computer program 1220a, 1220b, 1220C can be stored in any way which is suitable for the computer program product 1210a, 1210b, 1210C.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for enabling attestation of a platform comprising a Trusted Execution Environment (TEE) and a Trusted Platform Module (TPM), the TPM comprising a TPM Platform Configuration Register(s) (PCR(s)), the method being performed by the TEE and comprising:

receiving, from an Application of the platform, a request for generation of an attestation quote, the request comprising a nonce, information on which PCR(s) to be used and information relating to Attestation Keys;

establishing a connection to the TPM and obtaining from the TPM at least one PCR value;

generating the attestation quote based on the received nonce and the at least one PCR value;

signing the attestation quote, and rendering the attestation quote available for the Application, wherein the signing the attestation quote comprises signing the attestation quote using an attestation key and appending an associated certificate to the attestation quote.

2. The method as claimed in claim 1, further comprising: before the rendering, providing the attestation quote to the Application for verification of the attestation quote.

3. A Trusted Execution Environment (TEE) for enabling attestation of a platform, the TEE comprising:

processing circuitry configured to:

receive, from an Application of the platform, a request for generation of an attestation quote, the request comprising a nonce and information on which Platform Configuration Register(s) (PCR(s)) to be used;

establish a connection to a Trusted Platform Module (TPM) and obtaining from the TPM at least one PCR value;

generate the attestation quote based on the received nonce and the at least one PCR value;

sign the attestation quote, and render the attestation quote available for the Application, wherein the signing the attestation quote comprises signing the attestation quote using an attestation key and appending an associated certificate to the attestation quote.

4. The TEE as claimed in claim 3, wherein the processing circuitry is configured to: before the rendering, provide the attestation quote to the Application for verification of the attestation quote.

5. A method for generating an attestation quote, the method being performed by an Application stored on a host of a platform, the method comprising:

providing, to a Trusted Execution Environment (TEE) of the platform, a nonce and information on a Trusted Platform Module Platform Configuration Register (PCR), which is to be used, obtaining in response to the providing, the attestation quote from the TEE, and providing the attestation quote to a Verifier for verification of authenticity of a signature of the attestation quote, wherein the obtained attestation quote is signed by the TEE using an attestation key and appended with an associated certificate.

6. The method as claimed in claim 5, wherein the application is associated with a single TEE.

7. An Application enabling generation of an attestation quote, the Application comprising:

processing circuitry configured to:

provide, to a Trusted Execution Environment (TEE) of a platform on which the Application is stored, a nonce and information on a Trusted Platform Module Platform Configuration Register (PCR), which is to be used, obtain in response to the providing, the attestation quote from the TEE, and provide the attestation quote to a Verifier for verification of authenticity of a signature of the attestation quote, wherein the obtained attestation quote is signed by the TEE using an attestation key and appended with an associated certificate.

8. The Application as claimed in claim 7, wherein the Application is associated with a single TEE.

9. A platform comprising a Trusted Platform Module (TPM) and a Trusted Execution Environment (TEE), the platform further comprising processing circuitry, the processing circuitry being configured to cause the platform to perform the method of claim 1.

10. The platform as claimed in claim 9, further comprising an application.

11. The platform as claimed in claim 9, wherein the platform is a user equipment, a wireless communication device, a personal computer or a laptop.

* * * * *